United States Patent
Nakanishi

(10) Patent No.: US 12,327,154 B2
(45) Date of Patent: Jun. 10, 2025

(54) IC TAG AND SEMICONDUCTOR DEVICE

(71) Applicant: LAPIS Technology Co., Ltd., Yokohama (JP)

(72) Inventor: Koki Nakanishi, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/456,098

(22) Filed: Aug. 25, 2023

(65) Prior Publication Data

US 2024/0070432 A1     Feb. 29, 2024

(30) Foreign Application Priority Data

Aug. 26, 2022    (JP) ................. 2022-134787

(51) Int. Cl.
     *G06K 19/077*      (2006.01)

(52) U.S. Cl.
     CPC ... *G06K 19/07775* (2013.01); *G06K 19/0775* (2013.01)

(58) Field of Classification Search
     CPC ......... G06K 19/07775; G06K 19/0775; G06K 19/0723; Y02D 30/70
See application file for complete search history.

(56) References Cited

U.S. PATENT DOCUMENTS

| | | | | |
|---|---|---|---|---|
| 2008/0266010 A1* | 10/2008 | Endo | .................. | G06K 19/0723 |
| | | | | 331/172 |
| 2010/0060434 A1* | 3/2010 | Shiotsu | .............. | G06K 19/0717 |
| | | | | 340/10.51 |

FOREIGN PATENT DOCUMENTS

JP        2003-333112 A      11/2003

* cited by examiner

*Primary Examiner* — Matthew Mikels
(74) *Attorney, Agent, or Firm* — Rabin & Berdo, P.C.

(57) ABSTRACT

An IC tag includes: an antenna that receives a modulation signal in which a pause period, during which a carrier wave is interrupted, is intermittently present in a carrier wave signal; a clock signal extraction circuit that extracts, as a clock signal from the modulation signal received by antenna, a signal attained by binarizing the carrier wave included in the signal; a demodulation circuit that detects the received modulation signal to generate a binary detection signal; a control circuit that, during reception mode, restores a command data piece from the detection signal in synchronization with the clock signal and performs a process based on the command data piece; and a reset circuit unit that supplies, to the control circuit, a pause reset signal prompting a reset upon detecting the pause period in received modulation signal when the circuit is in a state other than the reception mode.

8 Claims, 3 Drawing Sheets

IC TAG AND SEMICONDUCTOR DEVICE

CROSS REFERENCE TO RELATED APPLICATION

This application is based upon and claims the benefit of priority of the prior Japanese Patent Application No. 2022-134787, filed on Aug. 26, 2022, the entire contents of which are incorporated herein by reference.

TECHNICAL FIELD

The present disclosure relates to an IC tag having a wireless communication function and a semiconductor device installed in the IC tag.

BACKGROUND ART

Recently, there was been increasingly widespread adoption of Internet of Things (IoT) systems in which integrated circuit (IC) tags provided with a sensor and having a communication function are installed in various items and are connected via a communication network such as the internet such that the states of the items are ascertained, remotely measured, and the like.

Known examples of such IC tags include contactless IC cards in which short-range wireless communication using electromagnetic waves with a communication terminal, referred to as a reader/writer, is performed in order to generate power source voltage using the electromagnetic waves and to exchange data (e.g., see Japanese Patent Application Laid-Open Publication No. 2003-333112). The contactless IC card disclosed in Japanese Patent Application Laid-Open Publication No. 2003-333112 includes an antenna, a power source circuit, a clock circuit, a demodulation circuit, a memory, and a control circuit.

The antenna receives radio waves subjected to amplitude shift keying (ASK) 100% modulation emitted from a reader/writer. In ASK 100% modulation defined in the international standard ISO/IEC 14443-2, a period in which radio waves are interrupted, referred to as a pause period, is provided in a 13.56 MHz carrier wave. In this case, the data to be transmitted is represented by where in the carrier wave, along the time axis, the pause period is inserted.

The power source circuit generates a power source voltage for the contactless IC card itself to operate by rectifying the reception signal received by the antenna, that is, the ASK 100%-modulated signal. The clock circuit generates a clock signal by binarizing the reception signal. The demodulation circuit acquires an envelope detection output by performing envelope detection on the reception signal, and extracts demodulated data by demodulating the envelope detection output. The control circuit interprets commands on the basis of the demodulated data and performs read/write control on the memory on the basis of the commands. In this case, the control circuit supplies data read from the memory to a modulation circuit. The modulation circuit supplies to the antenna a modulation signal attained by subjecting the data supplied from the control circuit to ASK 100% modulation, thereby transmitting a radio wave based on the modulation signal.

SUMMARY OF THE DISCLOSURE

When the contactless IC card is brought into close proximity with the reader/writer, the contactless IC card receives a carrier wave transmitted from the reader/writer and starts generating a power source voltage on the basis of the carrier wave. As a result, the contactless IC card starts up, and a so-called power-on reset signal and clock signal are generated therein to reset the above-mentioned circuits. Then, the contactless IC card transitions to a reception mode during which data transmitted from the reader/writer can be accurately received, after a prescribed period has elapsed after starting up the contactless IC card.

However, depending on the timing at which the contactless IC card is brought towards the reader/writer, there are cases in which the contactless IC card receives a carrier wave representing an unintended command transmitted from the reader/writer, or in other words, a carrier wave including a pause period, prior to transitioning to the reception mode. In this case, the clock signal is interrupted during the pause period, and as the clock signal resumes after the pause period ends, a glitch occurs in the clock signal during the resumption. This poses the risk that when a glitchy clock signal in which the glitch is present is inputted to the circuits, a malfunction occurs, and the contactless IC card becomes unresponsive.

An object of the present disclosure is to provide an IC tag and a semiconductor device by which it is possible to prevent such a malfunction.

An IC tag according to the present disclosure includes: an antenna that is configured to receive a modulation signal in which a pause period, during which a carrier wave is interrupted, is intermittently present in a carrier wave signal; a clock signal extraction circuit that is configured to extract, as a clock signal from the modulation signal received by the antenna, a signal attained by binarizing the carrier wave included in the modulation signal; a demodulation circuit that is configured to detect the received modulation signal to generate a binary detection signal; a control circuit that, during reception mode, restores a command data piece from the detection signal in synchronization with the clock signal and performs a process based on the command data piece; and a reset circuit unit that is configured to supply, to the control circuit, a pause reset signal upon detecting the pause period in the received modulation signal when the control circuit is in a state other than the reception mode.

A semiconductor device according to the present disclosure is a semiconductor device having an antenna terminal for connecting to an antenna configured to receive a modulation signal in which a pause period, during which a carrier wave is interrupted, is intermittently present in a carrier wave signal, the semiconductor device including: a clock signal extraction circuit that is configured to extract, as a clock signal from the modulation signal received by the antenna, a signal attained by binarizing the carrier wave included in the modulation signal; a demodulation circuit that is configured to detect the received modulation signal to generate a binary detection signal; a control circuit that, during reception mode, restores a command data piece from the detection signal in synchronization with the clock signal and performs a process based on the command data piece; and a reset circuit unit that is configured to supply, to the control circuit, a pause reset signal upon detecting the pause period in the received modulation signal when the control circuit is in a state other than the reception mode.

The present disclosure is configured such that when the control circuit, which performs various processes in synchronization with the clock signal extracted from the carrier wave in the modulation signal in which a pause period during which the carrier wave is interrupted is intermittently present in the carrier wave signal, is in a state other than reception mode, if a pause period is detected in the modulation signal, the control circuit is forcibly reset.

As a result, even if the clock signal were to have a glitch resulting from the start of generating the clock signal at the end of the pause period, the control circuit is forcibly reset during this time, and thus, a malfunction resulting from a glitchy clock signal can be avoided.

DETAILED DESCRIPTION OF EMBODIMENTS

Embodiments of the present disclosure will be explained in detail below with reference to the drawings.

Figure 1:
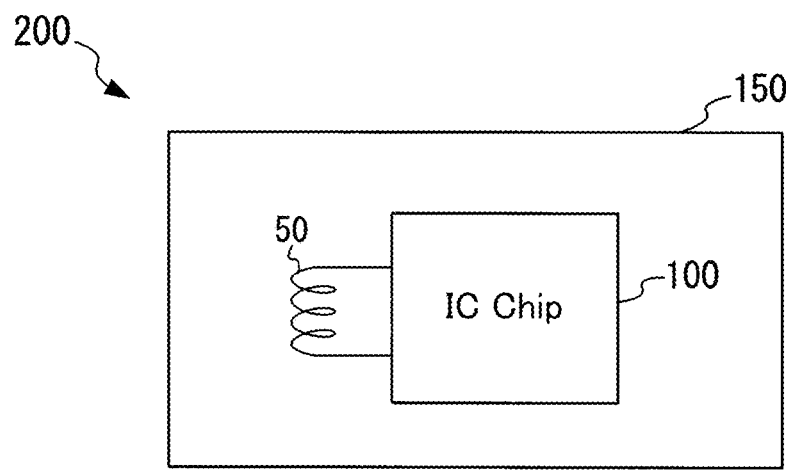
FIG. 1 is a front view of an IC tag 200 according to the present disclosure as seen from above.

FIG. 1 is a front view of the IC tag 200 according to the present disclosure as seen from above.

Figure 2:
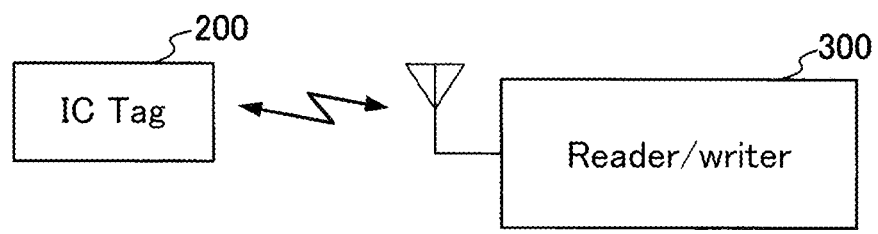
FIG. 2 shows an aspect in which short-range wireless communication is performed between the IC tag 200 and a reader/writer 300.

As shown in FIG. 2, the IC tag 200 performs short-range wireless communication with the reader/writer 300. The IC tag 200 and the reader/writer 300 perform short-range wireless communication through radio waves corresponding to a modulation signal yielded by subjecting an ultra-high frequency (UHF band), high frequency (HF) band, or low frequency (LF) band carrier wave signal to ASK 100% modulation based on an information data piece or a command data piece, for example. In the modulation signal subjected to ASK 100% modulation, the above-mentioned carrier wave signal is represented as is for intervals during which information data or command data pieces have a logic level of 0, for example, and in intervals where the logic level is 1 (referred to as a pause period), the carrier wave signal is interrupted and the signal level thereof is fixed at a prescribed constant value.

By the short-range wireless communication, the IC tag 200 wirelessly transmits the information data pieces acquired by a sensor (not shown) or the like, for example, to the reader/writer 300 according to a command wirelessly transmitted from the reader/writer 300.

As shown in FIG. 1, the IC tag 200 includes a substrate 150, and an antenna 50 and an IC chip 100 that are disposed on one surface of the substrate 150.

The antenna 50 is made of a conductive wiring material, for example, and the first end and second end thereof are connected to a pair of antenna terminals of the IC chip 100. The antenna 50 supplies the modulation signal obtained by receiving the radio waves emitted from the reader/writer 300 to the IC chip 100, or emits radio waves corresponding to the modulation signal supplied from the IC chip 100.

Figure 3:
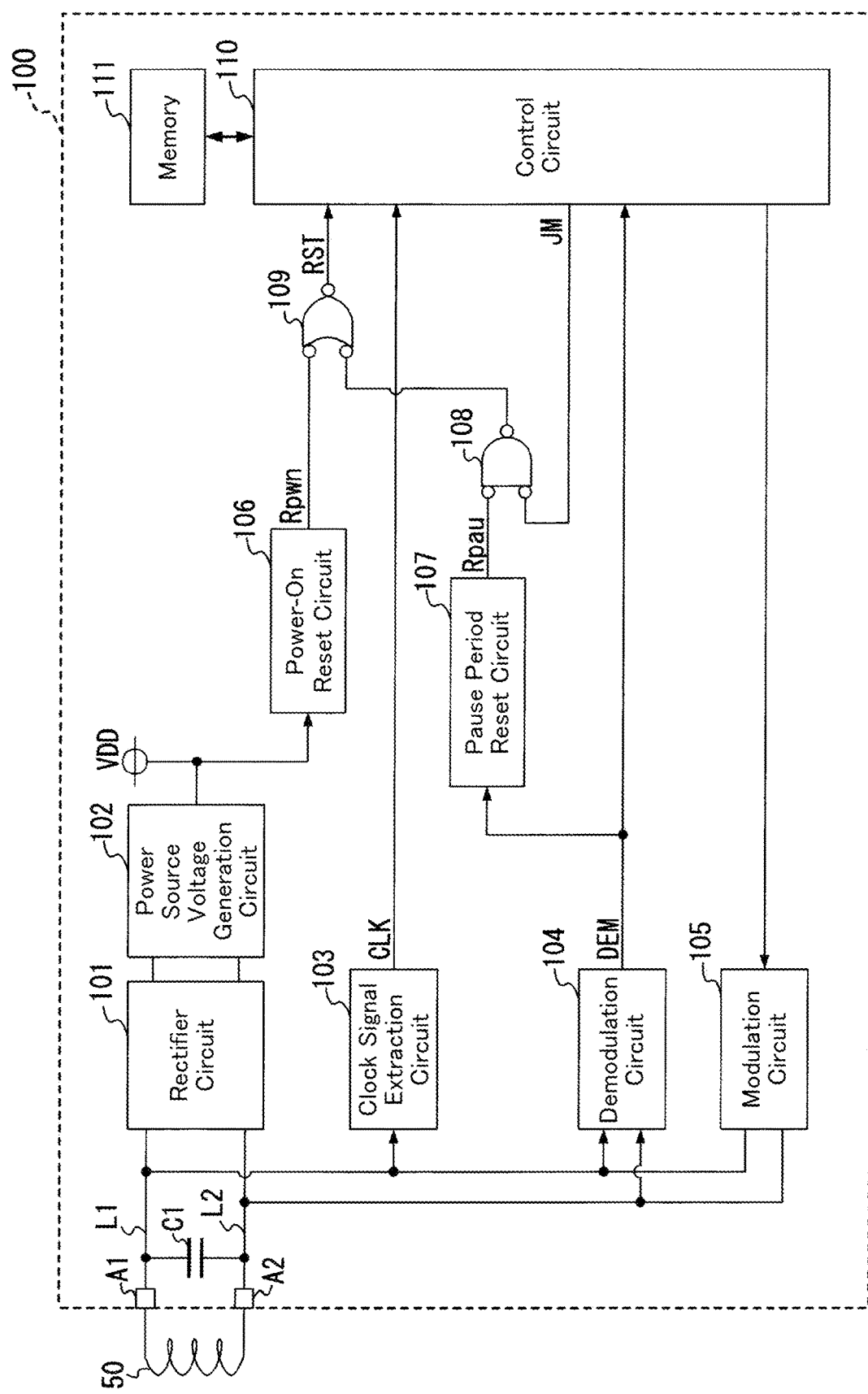
FIG. 3 is a block diagram showing an internal configuration of an IC chip 100.

FIG. 3 is a block diagram showing a circuit configuration formed in the IC chip 100.

As shown in FIG. 3, the IC chip 100 includes a capacitor C1, a rectifier circuit 101, a power source voltage generation circuit 102, a clock signal extraction circuit 103, a demodulation circuit 104, a modulation circuit 105, a power-on reset circuit 106, a pause period reset circuit 107, logic gates 108 and 109, a control circuit 110, and a memory 111.

Antenna terminals A1 and A2 of the IC chip 100 are connected to the first end and the second end of the antenna 50.

The antenna terminal A1 is connected via a line L1 to the first end of the capacitor C1, the rectifier circuit 101, the clock signal extraction circuit 103, the demodulation circuit 104, and the modulation circuit 105, and the antenna terminal A2 is connected via a line L2 to the second end of the capacitor C1, the rectifier circuit 101, the demodulation circuit 104, and the modulation circuit 105.

The rectifier circuit 101 generates a direct current voltage by rectifying a high frequency current based on the modulation signal transmitted from the antenna 50 via the lines L1 and L2, and supplies the direct current voltage to the power source voltage generation circuit 102. The power source voltage generation circuit 102 generates a power source voltage VDD with a constant voltage on the basis of the direct current voltage supplied from the rectifier circuit 101. The power source voltage generation circuit 102 supplies the power source voltage VDD, as a power source voltage to operate each circuit, to the clock signal extraction circuit 103, the demodulation circuit 104, the modulation circuit 105, the power-on reset circuit 106, the pause period reset circuit 107, the logic gates 108 and 109, the control circuit 110, and the memory 111. When the power source voltage VDD starts to be supplied to each circuit module (103-111), the IC chip 100 starts up.

The clock signal extraction circuit 103 extracts, as a clock signal CLK from the modulation signal supplied via the line L1, a signal attained by binarizing on the basis of a prescribed threshold, and supplies the clock signal CLK to the control circuit 110.

The demodulation circuit 104 detects the modulation signal supplied via the line L1 to generate a binary detection signal DEM having a logic level of 0 or 1, and supplies the detection signal to the control circuit 110.

The modulation circuit 105 transmits to the antenna 50 via the lines L1 and L2 a modulation signal yielded by subjecting the above-mentioned carrier wave signal to ASK 100% modulation on the basis of the information data pieces supplied from the control circuit 110.

The power-on reset circuit 106 generates a power-on reset signal Rpon having a logic level 0 that prompts a reset during a period in which the voltage value of the power source voltage VDD is in a state of being lower than a prescribed threshold voltage. On the other hand, if the voltage value of the power source voltage VDD is in a state of being greater than or equal to the prescribed threshold voltage, the power-on reset circuit 106 generates a power-on reset signal Rpon having a logic level 1 that prompts cancellation of reset. The power-on reset circuit 106 supplies the power-on reset signal Rpon to the logic gate 109.

Upon detecting a pause period for maintaining the logic level 1 from the detection signal DEM, the pause period reset circuit 107 generates a pause reset signal Rpau with a logic level 0 that prompts a reset during at least the pause period.

Specifically, the pause period reset circuit 107 generates a pause reset signal Rpau that maintains a logic level 0 prompting reset from a time point t2 at the front edge of the detection signal DEM to a time point t4 that is a prescribed period Tm from a time point t3 at the rear edge of the detection signal DEM, and maintains a logic level 1 for other periods. The pause period reset circuit 107 supplies the generated pause reset signal Rpau to the logic gate 108.

The logic gate 108 receives a reception mode signal JM transmitted from the control circuit 110 together with the pause reset signal Rpau. The reception mode signal JM is a binary signal having a logic level 1 when the IC tag 200 is in a reception mode state in which command data can be restored from the modulation signal corresponding to the radio waves received by the antenna 50, and having a logic level 0 during a state other than the reception mode. States other than the reception mode include a transmission mode in which the IC tag 200 wirelessly transmits the modulation signal to the reader/writer 300, a power feed mode, in which a radio wave for generating a power source voltage VDD wirelessly transmitted from the reader/writer 300 is received, or the like, for example.

The logic gate 108 supplies the pause reset signal Rpau to the logic gate 109 while the reception mode signal JM has a logic level 0, or in other words, only when in a state other than reception mode (non-reception mode). That is, when the IC tag 200 is in the non-reception mode, the logic gate 108 supplies to the logic gate 109 the pause reset signal Rpau having a logic level 0 that prompts a reset upon receiving said pause reset signal Rpau.

The logic gate 109 supplies the reset signal RST with a logic level 0 prompting a reset to the control circuit 110 upon receiving the power-on reset signal Rpon with a logic level 0 prompting a reset from the power-on reset circuit 106, or upon receiving the pause reset signal Rpau with the logic level 0 via the logic gate 108.

The control circuit 110 performs the following process in synchronization with the clock signal CLK supplied from the clock signal extraction circuit 103.

That is, after starting up the IC chip 100 and until a prescribed standby period elapses, the IC tag 200 is in the non-reception mode, and thus, during this period, the control circuit 110 supplies the reception mode signal JM with the logic level 0 indicating the non-reception mode to the logic gate 108. After the prescribed standby period elapses, the IC tag 200 is in the reception mode, and thus, the control circuit 110 supplies the reception mode signal JM with the logic level 1 indicating the reception mode to the logic gate 108.

Also, the control circuit 110 acquires the information data piece acquired by a sensor (not shown) or the like, and stores the information data piece in the memory 111 in association with an identification number of the relevant IC tag 200, for example.

Additionally, the control circuit 110 restores the command data on the basis of the detection signal DEM supplied from the demodulation circuit 104. Then, the control circuit 110 reads the above-mentioned information data piece and identification number from the memory 111 and supplies the same respectively to the modulation circuit 105 according to the command indicated by the command data. As a result, the modulation circuit 105 supplies to the antenna 50 a modulation signal attained by subjecting to ASK 100% modulation the carrier wave signal of the information data piece and the identification number, thereby emitting a radio wave corresponding to the modulation signal to the reader/writer 300.

Below, internal operations of the IC chip 100 shown in FIG. 3 will be described.

Figure 4:
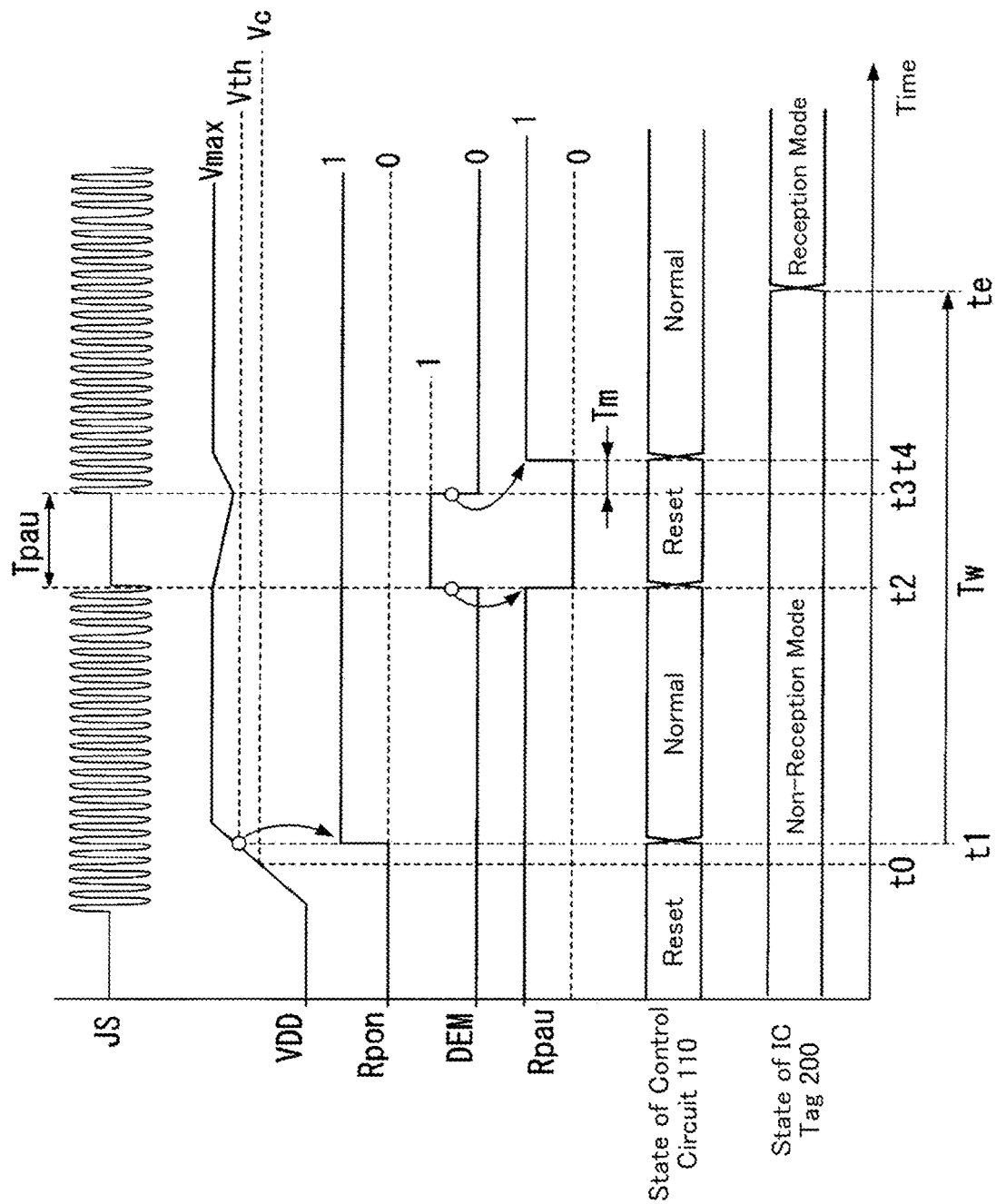
FIG. 4 is a time chart showing an internal operation of the IC chip 100.

FIG. 4 is a timing chart showing the internal operation waveforms of the IC chip 100 from when the IC tag 200 is started up due to a wireless power feed to when the IC tag 200 transitions to the reception mode, for when a modulation signal including a pause period is received.

First, the IC tag 200 is brought into close proximity with the reader/writer 300. As a result, the IC tag 200 starts reception of the radio waves emitted from the reader/writer 300, and acquires a modulation signal JS having the waveform shown in FIG. 4 via the antenna 50 and the lines L1 and L2. On the basis of the modulation signal JS, the power source voltage generation circuit 102 starts generating the power source voltage VDD. In this case, the voltage value of the power source voltage VDD gradually increases as shown in FIG. 4, and at the time point to, reaches a circuit operating voltage Vc that enables the circuits (103-111) to operate. As a result, the clock signal CLK begins to be supplied to the control circuit 110, and the control circuit 110 enters a reset state according to the reset signal RST indicating the power-on reset signal Rpon at the logic level 0 for prompting a reset.

Then, at the time point t1 when the power source voltage VDD rises to a prescribed threshold voltage Vth, the power-on reset signal Rpon transitions to a logic level 1, and the IC tag 200 enters a normal state, with the reset being canceled. Until the time point te, when a prescribed standby period Tw has elapsed from the time point t1, the IC tag 200 is set to the non-reception mode, and after the time point te, is set to the reception mode.

As shown in FIG. 4, after the power source voltage VDD reaches a maximum voltage Vmax, over the time period from the time point t2 to the time point t3 prior to the IC tag 200 transitioning to reception mode, a pause period Tpau during which the level of the carrier wave signal as the modulation signal JS is constant appears therein. That is, at timings other than the reception mode, the IC tag 200 receives the modulation signal with the waveform shown in FIG. 4 that includes the pause period Tpau, which takes up a portion of the command data.

The demodulation circuit 104 generates the detection signal DEM having a logic level 1 during the pause period Tpau and having a logic level 0 during other periods on the basis of the modulation signal. In this case, as shown in FIG. 4, the pause period reset circuit 107 generates a pause reset signal Rpau that maintains a logic level 0 prompting reset from the time point t2 at the front edge of the detection signal DEM to the time point t4 that is the prescribed period Tm after the time point t3 at the rear edge of the detection signal DEM.

The prescribed period Tm starts with the end time point of the pause period Tpau and lasts until a time point after both a time point in which a glitch appears in the clock signal CLK and a time point in which the carrier wave signal included in the modulation signal stabilizes.

The control circuit 110 is reset for the period from the time point t2 to the time point t4 shown in FIG. 4 according to the pause reset signal Rpau, and returns to a normal state upon the reset being canceled after the time point t4.

If the IC tag 200 is in a state other than reception mode and receives the modulation signal JS including the pause period Tpau shown in FIG. 4, then during the pause period Tpau (t2-t3), there is no carrier wave signal, and thus, the clock signal CLK cannot be generated. After the time point t3 when the pause period Tpau ends, the carrier wave signal appears in the modulation signal JS, and thus, generation of the clock signal CLK is resumed, but during this resumption, a glitch appears in the clock signal CLK. That is, immediately after the time point t3 shown in FIG. 4, the control circuit 110 is supplied a clock signal CLK having the glitch. This poses the risk that the control circuit 110 malfunctions due to the clock signal CLK with a glitch, and becomes unresponsive to the reader/writer 300.

However, if the IC tag 200 receives a modulation signal including the pause period during a state other than reception mode, then as shown in FIG. 4, the control circuit 110 is forcibly kept in a reset state from the time point t2, which is the start of the pause period, to the time point t4, which is after the end time point t3 of the pause period.

As a result, even if the clock signal CLK with a glitch were to be supplied to the control circuit 110 immediately after the end of the pause period, the control circuit 110 is in a reset state during the period, and thus, a malfunction resulting from a clock signal with a glitch can be avoided. At this time, the pause period ends, the reset is canceled at the time point t4 when the carrier wave signal included in the modulation signal stabilizes, and then, a normal clock signal CLK that does not have a glitch is supplied to the control circuit 110.

As a result, the IC tag 200 transitions to reception mode in a normal state after the cancellation of the reset, enabling response to the reader/writer 300.

In the configuration shown in FIG. 3, the timing of the front edge of the detection signal DEM generated by the demodulation circuit 104 serves as a trigger for the pause period reset circuit 107 to generate the pause reset signal Rpau, but a circuit that generates the pause reset signal Rpau directly from the received modulation signal without passing through the demodulation circuit 104 may be provided.

Also, in the configuration shown in FIG. 3, the power-on reset circuit 106, the pause period reset circuit 107, and the logic gates 108 and 109 are provided as reset circuit units that reset the control circuit 110. However, a circuit that performs similar operations to at least the pause period reset circuit 107 and the logic gate 108 may be included in order to prevent glitches appearing in the clock signal immediately after the pause period as described above.

Essentially, any configuration may be used for the IC tag according to the present disclosure as long as the antenna, clock signal extraction circuit, demodulation circuit, control circuit, and reset circuit units according to the following configurations are included therein.

That is, the antenna (50) transmits or receives a modulation signal in which a pause period (Tpau) during which the carrier wave is interrupted is intermittently present in the carrier wave signal. The clock signal extraction circuit (103) extracts, as a clock signal (CLK) from the modulation signal received by the antenna, a signal attained by binarizing the carrier wave included in the modulation signal. The demodulation circuit (104) detects the received modulation signal to generate a binary detection signal (DEM). During reception mode, the control circuit (110) restores the command data piece from the detection signal in synchronization with the clock signal and performs a process based on the command data piece. The reset circuit units (106-109) supply, to the control circuit, the pause reset signal (Rpau) prompting a reset upon detecting a pause period in the received modulation signal when the control circuit is in a state other than reception mode.

What is claimed is:

1. An IC tag, comprising:
   an antenna that is configured to receive a modulation signal including a plurality of pause periods during which a carrier wave included in the modulation signal is interrupted, is intermittently present in a carrier wave signal;
   a clock signal extraction circuit that is configured to extract, as a clock signal from the modulation signal received by the antenna, a signal attained by binarizing the carrier wave included in the modulation signal;
   a demodulation circuit that is configured to detect the received modulation signal to generate a binary detection signal;
   a control circuit that, during a reception mode, restores a command data piece from the binary detection signal in synchronization with the clock signal and performs a process based on the command data piece; and
   a reset circuit unit that is configured to supply, to the control circuit, a pause reset signal upon detecting a pause period in the received modulation signal when the control circuit is in a state other than the reception mode, wherein
   the reset circuit unit generates a signal, as the pause reset signal, which resets the control circuit from a time point between a start time point and an end time point of the detected pause period to a time point that is a prescribed period after the end time point.

2. The IC tag according to claim 1,
   wherein the reset circuit unit generates the pause reset signal during a period from the time point between the start time point and the end time point of the detected pause period to a time point that is the prescribed period after the end time point.

3. The IC tag according to claim 2,
   wherein the reset circuit unit generates the pause reset signal during a period from a time point of a front edge of the binary detection signal to a time point that is the prescribed period from a time point of a rear edge of the binary detection signal according to the binary detection signal generated by the demodulation circuit based on the received modulation signal.

4. The IC tag according to claim 3,
   wherein the prescribed period starts with the end time point of the detected pause period and lasts until a time point after a time point in which a glitch appears in the clock signal.

5. The IC tag according to claim 1, further comprising:
   a power source voltage generation unit that is configured to generate a power source voltage by which the control circuit is operated based on the received modulation signal,
   wherein the reset circuit unit includes a power-on reset circuit that is configured to generate a power-on reset signal until a voltage value of the power source voltage reaches a prescribed threshold voltage, the reset circuit unit supplying the power-on reset signal or the pause reset signal to the control circuit.

6. A semiconductor device having an antenna terminal for connecting to an antenna configured to receive a modulation signal in which a pause period, during which a carrier wave included in the modulation signal is interrupted, is intermittently present in a carrier wave signal, the semiconductor device comprising:
   a clock signal extraction circuit that is configured to extract, as a clock signal from the modulation signal received by the antenna, a signal attained by binarizing the carrier wave included in the modulation signal;
   a demodulation circuit that is configured to detect the received modulation signal to generate a binary detection signal;
   a control circuit that, during a reception mode, restores a command data piece from the binary detection signal in synchronization with the clock signal and performs a process based on the command data piece; and
   a reset circuit unit that is configured to supply, to the control circuit, a pause reset signal upon detecting the pause period in the received modulation signal when the control circuit is in a state other than the reception mode.

7. The IC tag according to claim 1,
wherein a level of the carrier wave signal is constant during the pause period.

8. The IC tag according to claim 4, wherein after the pause period ends, a reset corresponding to the pause reset signal is canceled at the time point after the time point in which the glitch appears in the clock signal and when the carrier wave signal stabilizes, and a normal clock signal that does not have a glitch is supplied to the control circuit.

* * * * *